United States Patent
Hoshi et al.

(10) Patent No.: US 6,704,829 B1
(45) Date of Patent: Mar. 9, 2004

(54) SWITCH INPUT PROCESSING MODULE FOR SWITCHING SIGNAL TRANSMISSION LINES TO TRANSMIT DIFFERENT TYPES OF SIGNALS

(75) Inventors: Toshiyuki Hoshi, Miyagi-ken (JP); Ken Shibazaki, Miyagi-ken (JP); Ken Mizuta, Miyagi-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 495 days.

(21) Appl. No.: 09/712,384

(22) Filed: Nov. 13, 2000

(30) Foreign Application Priority Data

Nov. 24, 1999 (JP) ............................................ 11-332981

(51) Int. Cl.$^7$ .............................................. G06F 13/14
(52) U.S. Cl. ...................... 710/305; 710/104; 710/314; 710/315; 710/316; 710/1; 710/15; 370/463; 370/535; 713/300; 713/310; 307/112; 307/113; 323/318
(58) Field of Search .............................. 710/1, 15, 100, 710/104, 107, 305, 314, 315, 316; 340/2.2, 855.3, 904, 426.31; 330/51; 341/156; 370/463, 397, 420, 535; 375/216, 222; 713/300, 310; 307/112, 113; 323/318; 180/315, 320; 701/1.41, 465; 200/42.01, 51.03, 51.05

(56) References Cited

U.S. PATENT DOCUMENTS

| | | | | |
|---|---|---|---|---|
| 4,839,854 A | * | 6/1989 | Sakami et al. .................. | 710/1 |
| 5,450,412 A | * | 9/1995 | Takebayashi et al. ........ | 370/463 |
| 5,473,760 A | * | 12/1995 | Horiuchi ....................... | 710/15 |
| 5,546,404 A | | 8/1996 | Takahashi et al. | |
| 5,568,486 A | * | 10/1996 | Huscroft et al. .......... | 370/395.2 |
| 5,623,493 A | * | 4/1997 | Kagemoto .................... | 370/397 |
| 5,734,334 A | * | 3/1998 | Hsieh et al. ................... | 340/2.2 |
| 6,084,883 A | * | 7/2000 | Norrell et al. ............... | 370/420 |
| 6,111,897 A | * | 8/2000 | Moon .......................... | 370/535 |
| 6,225,865 B1 | * | 5/2001 | Muterspaugh ................ | 330/51 |
| 6,310,572 B1 | * | 10/2001 | Endo et al. ................... | 341/156 |
| 6,421,375 B1 | * | 7/2002 | Chu et al. .................... | 375/222 |
| 6,546,044 B1 | * | 4/2003 | Dent ............................ | 375/216 |
| 6,574,280 B1 | * | 6/2003 | Liau et al. ................... | 375/242 |

OTHER PUBLICATIONS

M. Morris Mano, "Computer System Architecture", 1982, Prentice–Hall, inc., 2nd Ed.. pp415–426.*

* cited by examiner

Primary Examiner—Gopal C. Ray
Assistant Examiner—Justin King
(74) Attorney, Agent, or Firm—Brinks Hofer Gilson & Lione

(57) ABSTRACT

The switch input processing module has: a control unit; a first external connection terminal to which either an analog signal of an analog signal system or a serial signal of a serial signal system is supplied; an analog signal transmission and serial signal transmission line which is disposed between the first external connection terminal and the control unit; and a second external connection terminal to which a determination signal indicating that either the analog signal system or the serial signal system is connected to the first external connection terminal is supplied. When the control unit determines that the determination signal indicates connection of the serial signal system, the control unit makes the serial signal transmission line conductive. When the control unit determines that the determination signal indicates connection of the analog signal system, the control unit makes the serial signal transmission line nonconductive.

8 Claims, 8 Drawing Sheets

SWITCH INPUT PROCESSING MODULE FOR SWITCHING SIGNAL TRANSMISSION LINES TO TRANSMIT DIFFERENT TYPES OF SIGNALS

BACKGROUND OF THE INVENTION

Field of the Invention

The present invention relates to a switch input processing module and, more particularly, to a switch input processing module in which either an analog signal system or a serial signal system is selectively connected to an external connection terminal, and which switches a signal transmitting state of a serial signal transmission line in accordance with the kind of a signal supplied which is either an analog signal or a serial signal.

Hitherto, as one of devices mounted on a vehicle, a signal transmitting device related to steering, which is disposed on or near a steering mechanism and transmits various signals is known. The signal transmitting device related to steering has: various manually-operated switches arranged near the steering wheel, a signal source which is disposed in the steering wheel and generates a signal corresponding to an operating state of each of the various manually-operated switches; a switch input processing module (base module) for dealing with an output signal from the signal source; and a cable reel connecting the signal source and the switch input processing module. In this case, the cable reel is disposed around a wheel shaft close to the coupling portion o the wheel shaft and the steering wheel. The cable reel takes the form of a flexible cable or the like which is spirally wound for coupling the signal source attached to the rotating steering wheel and the switch input processing module fixedly disposed in the wheel shaft holding portion.

The operation of the signal transmitting device related to steering will be briefly described as follows.

In the case where any one of the various manually-operated switches disposed near the steering wheel is operated, the signal source outputs a signal corresponding to the manually-operated switch, and the derived signal is supplied to a signal input port of the switch input processing module via the cable reel. In response to the supplied signal, the switch input processing module performs adjustment corresponding to the operating state of the manually-operated switch for a device such as an audio device mounted on the vehicle related to the operated manually-operated switch.

A known signal transmitting device related to steering selectively has an analog signal source for outputting an analog signal and a serial signal source for outputting a serial signal as signal sources. In accordance with a car model or the like of the vehicle, either the analog signal source or the serial signal source is selectively used. In this case, the analog signal source has various manually-operated switches and an analog multiplex (MPX) for outputting a voltage obtained by the operation of any of the manually-operated switches as an analog signal. The serial signal source has various manually-operated switches and a serial multiplex (MPX) for detecting an operating state of the manually-operated switches and outputting the detection output as a serial signal.

Depending on which one of the analog signal source or the serial signal source is used as a signal source, the configuration of the switch input processing module to be used differs. Specifically, in the case of using the analog signal source, an analog signal type switch input processing module capable of receiving and processing an analog signal has to be used. On the other hand, in the case of using the serial signal source, a serial signal type switch input processing module capable of receiving and processing a serial signal has to be used.

As described above, in the known signal transmitting device related to steering, whether the analog signal source or the serial signal source is used as a signal source is selectively set. Consequently, the switch input processing module has processing means which can deal with any signal source selected. In this case, according to first processing means, two kinds of switch input processing modules of an analog signal type switch input processing module and a serial signal type switch input processing module are prepared. In accordance with the kind of the signal source selected and used, the kind of the switch input processing module is selected. According to second processing means, a common switch input processing module having the function of both the analog signal type switch input processing module and the serial signal type switch input processing module is used as a switch input processing module. The common switch input processing module is provided with an external connection terminal capable of receiving an analog signal from an analog signal source and an external connection terminal capable of receiving a serial signal from a serial signal source. In accordance with the kind of the signal source selected and used, the external connection terminal of the common switch input processing module is selectively used.

The known signal transmitting device related to steering has processing means which can be adapted to any of the analog signal source or the serial signal source on the switch input processing module side. As the first processing, two kinds of modules of the analog signal type switch input processing module and the serial signal type switch input processing module have to be prepared. It makes the configuration of the whole switch input processing module complicated. Moreover, the manufacturing cost increases largely. On the other hand, as the second processing means, the common switch input processing module provided with the external connection terminal capable of receiving an analog signal and the external connection terminal capable of receiving a serial signal is used. Consequently, as compared with the first processing means, the configuration is less complicated and the manufacturing cost is slightly lower. However, it is not easy to achieve the common switch input processing module having the external connection terminals which can deal with the two kinds of signals and can receive the two kinds of signals separately. The configuration of the whole switch input processing module is still complicated and the manufacturing cost is still high.

SUMMARY OF THE INVENTION

The invention has been achieved in consideration of such a technical background. It is an object of the present invention to provide a switch input processing module having a simple configuration at low manufacturing cost, which uses an external connection terminal common to an analog signal and a serial signal and can selectively receive the analog and serial signals by a simple configuration change.

According to the invention, in order to achieve the object, there is provided a switch input processing module having: a control unit; a first external connection terminal to which either an analog signal from an analog signal system or a serial signal from a serial signal system is supplied; an analog signal transmission and serial signal transmission line which is disposed between the first external connection terminal and the control unit; and a second external connection terminal to which a determination signal indicating that either the analog signal system or the serial signal system is connected to the first external connection terminal is supplied, wherein when the control unit determines that the determination signal indicates connection of the serial signal system, the control unit makes the serial signal transmission line conductive, and when the control unit determines, that the determination signal indicates connection of the analog signal system, the control unit makes the serial signal transmission line nonconductive.

In such a configuration, the determination signal indicating whether the signal to be supplied is an analog signal or a serial signal is supplied to the control unit prior to the supply of the analog or serial signal. When the determination signal supplied is indicative of an analog signal, the control unit makes the serial signal transmission line nonconductive to thereby supply the analog signal only to the analog signal supply port. When the determination signal supplied is indicative of a serial signal, the control unit makes the serial signal transmission line conductive to thereby supply the serial signal only to the serial signal supply port via the serial signal transmission line. Thus, by making a simple configuration change, the switch input processing module can be commonly used by the analog and serial signal and, as a result, the switch input processing module with a simple configuration can be obtained at a low manufacturing cost.

According to the invention, the first and second external connection terminals may be connection terminals which are different from each other.

In such a configuration, the external connection terminal to which the determination signal is supplied can be provided separate from the external connection terminal to which the analog or serial signal is supplied. Consequently, the determination signal can be generated independent of the analog or serial signal.

Further, according to the invention, the first and second external connection terminals may be connection terminals which are the same.

In such a configuration, it is unnecessary to separately provide the external connection terminal to which the determination signal is supplied. The external connection terminal can be therefore effectively used.

According to the invention, preferably, the determination signal indicative of connection of the serial signal system is a voltage signal equal to a reference voltage, and the determination signal indicative of connection of the analog signal system is a voltage signal lower than the reference voltage.

In the configuration, when the control unit determines the determination signal, it is sufficient to see whether the signal is equal to or lower than the reference voltage. Thus, the determination signal can be easily determined.

According to the invention, preferably, the determination signal indicative of connection of the serial signal system is a pulse signal having a predetermined pulse width and/or a predetermined number of pulses.

In the configuration, the control unit can easily generate a determination signal prior to supply of the serial signal. When the control unit determines the determination signal, it is sufficient to measure the pulse width and/or the number of pulses by counting clock signals. The determination signal can be therefore easily determined.

DETAILED DESCRIPTION OF THE PREFERRED EMBODIMENTS

Embodiments of the invention will be described hereinbelow with reference to the drawings.

Figure 1:
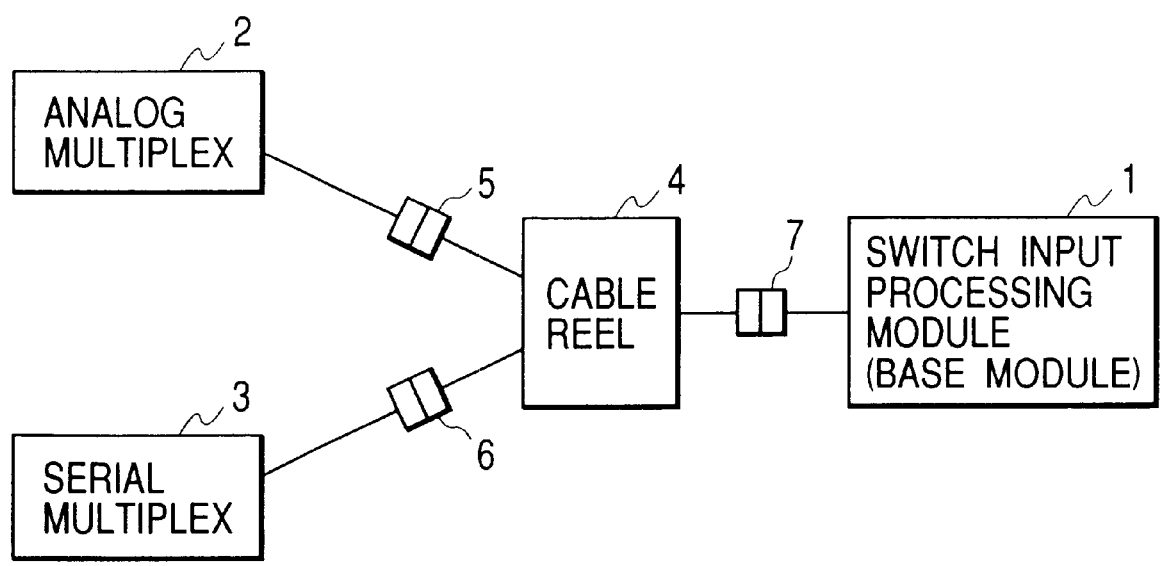
FIG. 1 is a block diagram showing a configuration of the main portion of a signal transmitting device related to steering, which uses a switch input processing module according to the invention.

FIG. 1 is a block diagram showing the configuration of the main portion of a signal transmitting device related to steering using a switch input processing module according to the invention.

As shown in FIG. 1, the signal transmitting device related to steering has a switch input processing module (base module) 1, an analog multiplex (MPX) 2, a serial multiplex (MPX) 3, a cable reel 4, a first connector 5, a second connector 6, and a third connector 7.

In the case, either the analog multiplex 2 or the serial multiplex 3 is selectively used according to the car model or the like of the vehicle. When the analog multiplex 2 is used, the analog multiplex 21 is connected to the first connector 5, and the switch input processing module 1 is coupled to the analog multiplex 2 via the cable reel 4 and the first connector 5. On the other hand, when the serial multiplex 3 is used, the serial multiplex 3 is connected to the second connector 6, and the switch input processing module 1 is coupled to the serial multiplex 3 via the cable reel 4 and the second connector 6. Although not shown in FIG. 1, a manually-operated switch related to the analog multiplex 2 is disposed in the analog multiplex 2. A manually-operated switch related to the serial multiplex 3 is disposed in the serial multiplex 3.

In the signal transmitting device related to steering, the switch input processing module 1 is fixedly disposed in a wheel shaft holding part. The analog multiplex 2 or the serial multiplex 3 is attached to the steering wheel which rotates. The cable reel 4 is disposed around the wheel shaft close to the coupling portion of the wheel shaft and the steering wheel and takes the form of a flexible cable wound in a spiral state. The cable reel 4 is used to couple the switch input processing module 1 in the fixed position and the analog multiplex 2 or the serial multiplex 3 which rotates with the steering wheel.

Figure 2:
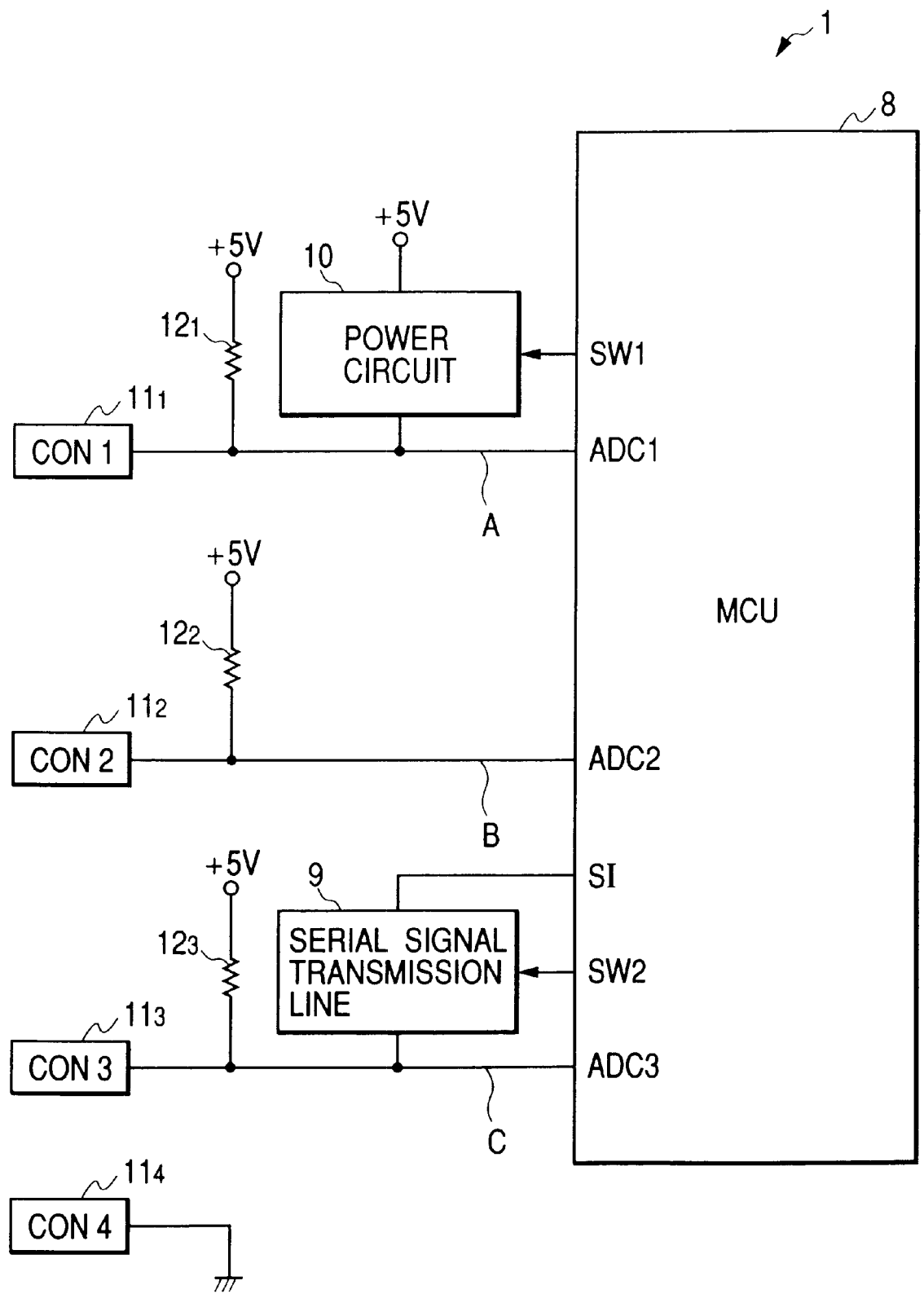
FIG. 2 is a circuit diagram showing an embodiment of the switch input processing module for use in the signal transmitting device related to steering illustrated in FIG. 1.
Figure 3:
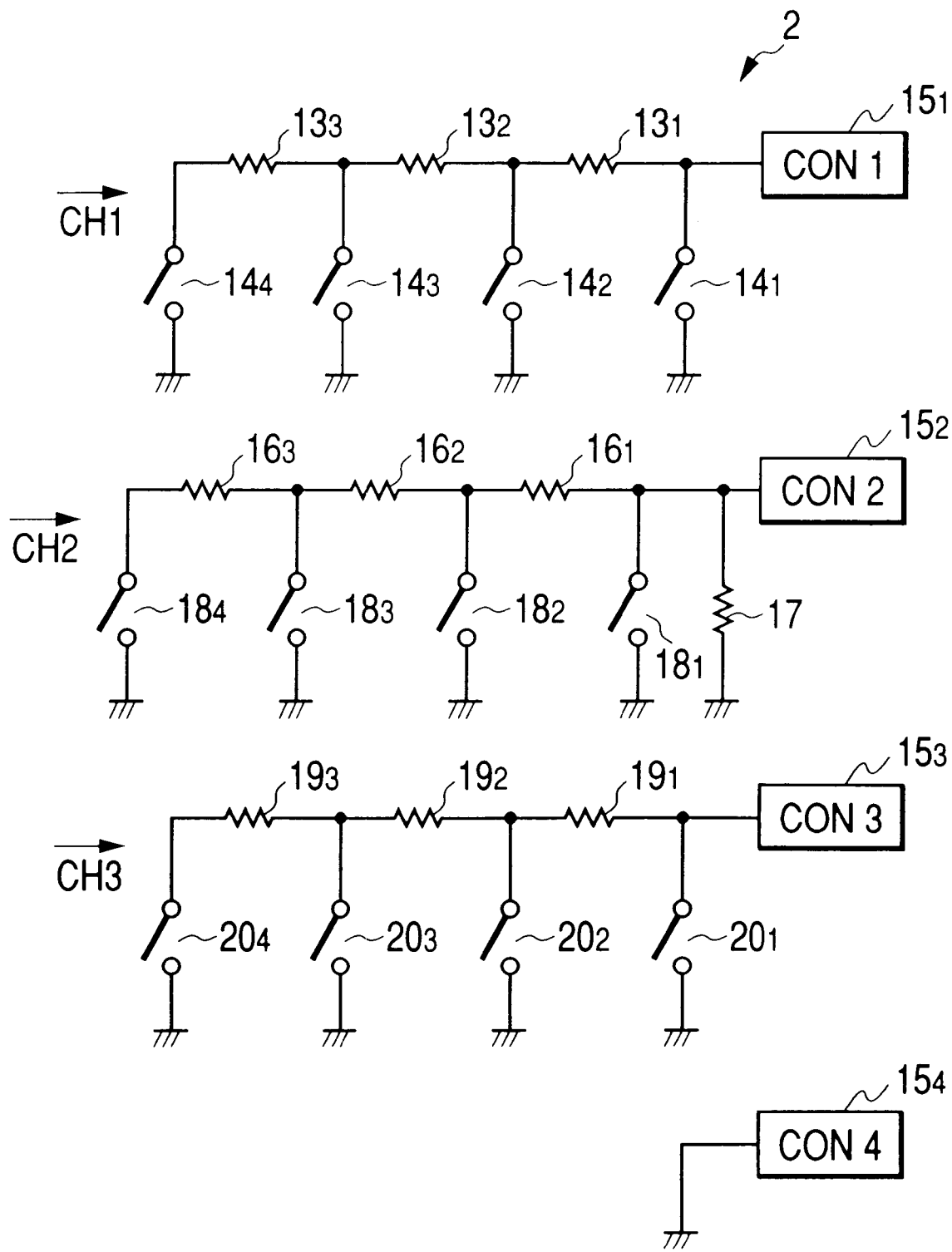
FIG. 3 is a circuit diagram showing an example of the configuration of an analog multiplex for use in the signal transmitting device related to steering illustrated in FIG. 1.
Figure 4:
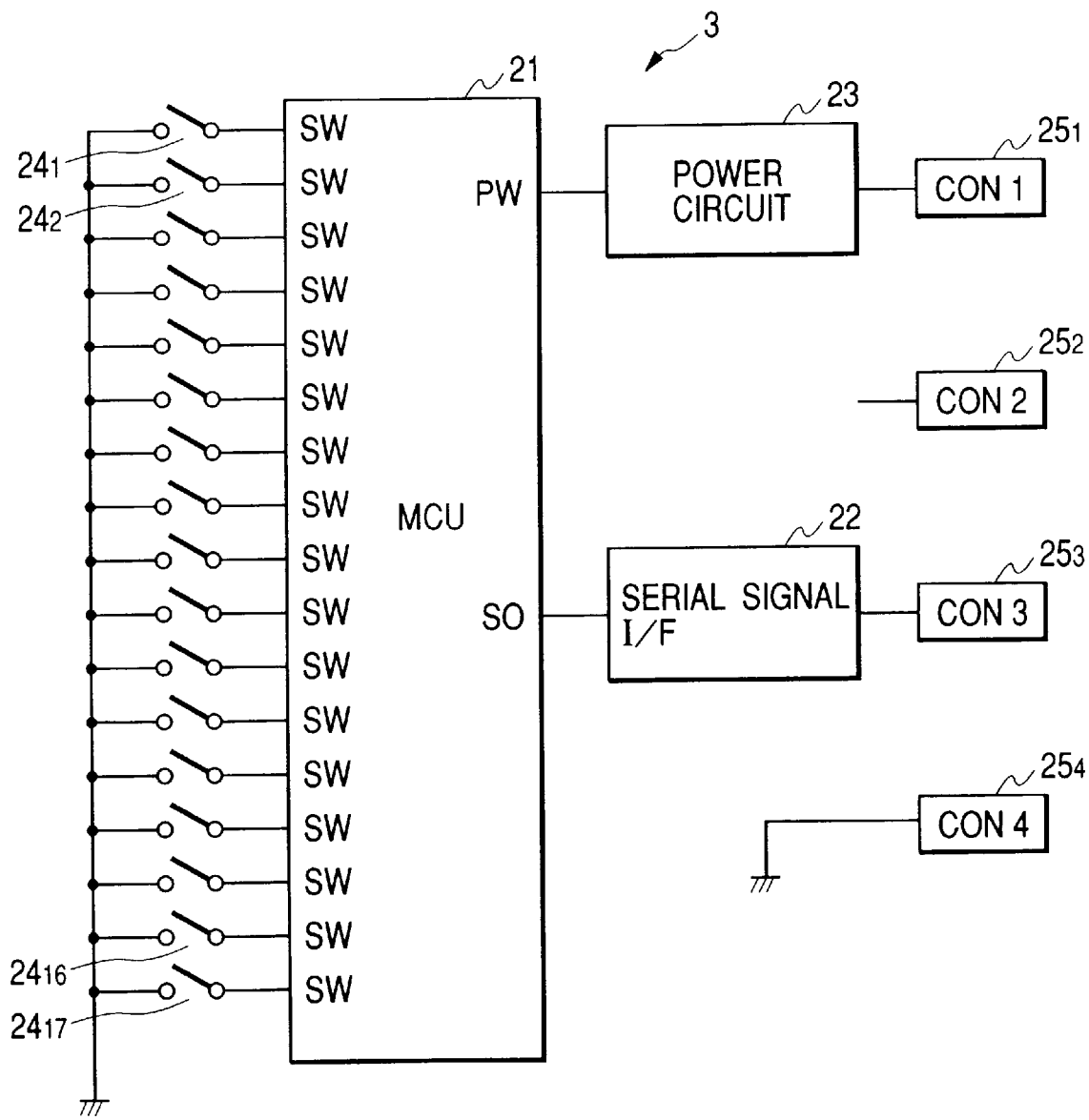
FIG. 4 is a circuit diagram showing an example of the configuration of a serial multiplex for use in the signal transmitting device related to steering illustrated in FIG. 1.

FIG. 2 is a circuit diagram showing an embodiment of the configuration of the switch input processing module 1 used for the signal transmitting device related to steering shown in FIG. 1. FIG. 3 is a circuit diagram showing the configuration of the analog multiplex 2 for use in the signal transmitting device related to steering illustrated in FIG. 1. FIG. 4 is a circuit diagram showing the configuration of the serial multiplex 3 for use in the signal transmitting device related to steering illustrated in FIG. 1.

As shown in FIG. 2, the switch input processing module 1 according to the embodiment has a micro computer unit (MCU) 8, a serial signal transmission line 9, a power circuit 10, a first connector (CON1) $11_1$, a second connector (CON2) $11_2$, a third connector (CON3) $11_3$, a fourth connector (CON4) $11_4$, and resistors $12_1$, $12_2$, and $12_3$.

The MCU 8 has: a first input port ADC1 connected via an analog signal transmission line A to the first connector $11_1$, and further connected to an output terminal of the power circuit 10; a first switch port SW1 connected to a switch terminal of the power circuit 10; a second input port ADC2 connected via an analog signal transmission line B to the second connector $11_2$; a serial signal input port SI connected to an output terminal of the serial signal transmission line 9; a third input port ADC3 connected via an analog signal transmission line C to the third connector $11_3$ and an input terminal of the serial signal transmission line 9; and a second switch port SW2 connected to a control terminal of the serial signal transmission line 9. One end of the resistor $12_1$ is connected to a power source terminal +5V and the other end is connected to the first connector $11_1$. One end of the resistor $12_2$ is connected to a power source terminal +5V and the other end is connected to the first connector $11_1$. One end of the resistor $12_2$ is connected to the power source terminal +5V ad the other end is connected to the second connector $11_2$. One end of the resistor $12_3$ is connected to a power source terminal +5V, and the other end is connected to the third connector $11_3$. The fourth connector $11_4$ is connected to the earth point.

As shown in FIG. 3, the analog multiplex 2 has first to third channels and a fourth connector (CON4) $15_4$. The first channel (CH1) includes resistors $13_1$, $13_2$, $13_3$, switches $14_1$, $14_2$, $14_3$, and $14_4$, and a first connector (CON1) $15_1$. The second channel (CH2) includes resistors $16_1$, $16_2$, $16_3$, and 17, switches $18_1$, $18_2$, $18_3$, and $18_4$, and a second connector (CON2) $15_2$. The third channel (CH3) includes resistors $19_1$, $19_2$, and $19_3$, switches $20_1$, $20_2$, $20_3$, and $20_4$, and a third connector (CON3) $15_3$.

In the first channel (CH1), the three resistors $13_1$, $13_2$, and $13_3$ are connected in series. One end of the resistor $13_1$ is connected to both the first connector $15_1$ and an earth point via the switch $14_1$. A connection point of the resistors $13_1$ and $13_2$ is connected to an earth point via the switch $14_2$. A connection point of the resistors $13_2$ and $13_3$ is connected to an earth point via the switch $14_3$. The other end of the resistor $13_3$ is connected to an earth point via the switch $14_4$. In the second channel (CH2), the three resistors $16_1$, $16_2$, and $16_3$ are connected in series. One end of the resistor $16_1$ is connected to the second connector $15_2$ and to an earth point via a parallel connection circuit of the switch $18_1$ and the resistor 17. A connection point of the resistors $16_1$ and $16_2$ is connected to an earth point via the switch $18_2$. A connection point of the resistors $16_2$ and $16_3$ is connected to an earth point via the switch $18_3$. The other end of the resistor $16_3$ is connected to an earth point via the switch $18_4$. In the third channel (CH3), the three resistors $19_1$, $19_2$, and $19_3$ are connected in series. One end of the resistor $19_1$ is connected to the third connector $15_3$ and to an earth point via the switch $20_1$. A connection point of the resistors $19_1$ and $19_2$ is connected to an earth point via the switch $20_2$. A connection point of the resistors $19_2$ and $19_3$ is connected to an earth point via the switch $20_3$. The other end of the resistor $19_3$ is connected to an earth point via the switch $20_4$. The fourth connector $15_4$ is connected to an earth point.

As shown in FIG. 4, the serial multiplex 3 has a micro computer unit (MCU) 21, a serial signal interface (I/F) 22, a power circuit 23, a plurality of switches $24_1$ to $24_{17}$, a first connector (CON1) $25_1$, a second connector (CON2) $25_2$, a third connector (CON3) $25_3$, and a fourth connector (CON4) $25_4$.

The MCU 21 has: a plurality of switch ports SW which are connected to an earth point via the respective switches $24_1$ to $24_{17}$; a serial signal output port SO connected to an input terminal of the serial signal interface (I/F) 22; and a power source port PW connected to an output terminal of the power circuit 23. An output terminal of the serial signal interface 22 is connected to the third connector $25_3$. An input terminal of the power circuit 23 is connected to the first connector $25_1$. The second connector $25_2$ is open, and the fourth connector $25_4$ is connected to an earth point.

When the switch input processing module 1 is connected to the analog multiplex, 2 via the cable reel 4 shown in FIG. 1, in the switch input processing module 1, the first connector $11_1$ is connected to the first connector $15_1$ in the analog multiplex 2, the second connector $11_2$ is connected to the second connector $15_2$ in the analog multiplex 2, the third connector $11_3$ is connected to the third connector $15_3$ in the analog multiplex 2, and the fourth connector $11_4$ is connected to the fourth connector $15_4$ in the analog multiplex 2.

On the other hand, when the switch input processing module 1 is connected to the serial multiplex 3 via the cable reel 4 shown in FIG. 1, in the switch input processing module 1, the first connector $11_1$ is connected to the first connector $25_1$ in the serial multiplex 3, the second connector $11_2$ is connected to the second connectors $25_2$ in the serial multiplex 3, the third connector $11_3$ is connected to the third connector $25_3$ in the serial multiplex 3, and the fourth connector $11_4$ is connected to the fourth connector $25_4$ in the serial multiplex 3.

First, the operation in the case where the analog multiplex 2 is selectively connected to the switch input processing module 1 having the above configuration will be described.

When the analog multiplex 2 is connected to the switch input processing module 1, a switching-off signal is supplied from the first switch port SW1 to the control terminal of the power circuit 10 to switch the power circuit 10 off, and the impedance of the output terminal side of the power circuit 10 seen from the first input port ADC1 is increased to a high value. The power source voltages at the power source terminals +5V are supplied to the first, second, and third connectors $11_1$, $11_2$, $11_3$ via the resistors $12_1$, $12_2$, and $12_3$, respectively, and are transferred to the first, second, and third connectors $15_1$, $15_2$, and $15_3$ in the analog multiplex 2, respectively, via the cable reel 4 shown in FIG. 1.1

When none of the switches $14_1$, $14_2$, $14_3$, and $14_4$ is operated in the first channel (CH1) in the analog multiplex 2 in such a state, the power source voltage supplied to the first connector $15_1$ does not attenuate. Consequently, the power source voltage (+5V) supplied to the first connector $11_1$ in the switch input processing module 1 is supplied as it is to the first input port ADC1 in the MCU 8. The MCU 8 detects a state in which no analog signal is supplied to the first input port ADC1. In this case, the first input port ADC1 in the MCU 8 is a port dedicated to process an analog signal. As will be described hereinlater, when the serial multiplex 3 is connected to the switch input processing module 1, no serial signal is supplied to the first input port ADC1.

In the second channel (CH2), in the case where none of the switches $18_1$, $18_2$, $18_3$, and $18_4$ is operated, the power source voltage at the power source terminal +5V is divided by the resistors $12_2$ and 17. The divided voltage (for example, 2.5V) is applied to the second connector $15_2$, and the same divided voltage is applied as a determination signal to the second connector $11_2$ in the switch input processing module 1. The determination signal is supplied to the second input port ADC2 of the MCU 8. When the d termination signal is supplied to the second input port ADC2, the MCU 8 analog-to-digital converts the determination signal into a digital determination signal, and compares the obtained digital determination signal with a digital reference voltage value (for example, 2.5V) prestored in an internal memory. From the comparison, the MCU 8 determines whether or not the voltage value of the digital determination signal is equal to or smaller than the digital reference voltage value The MCU 8 supplies a switching-off signal from the second switch port SW2 to the control terminal of the serial signal transmission line 9 to make the serial signal transmission line 9 discontinue and to make the input terminal to have a high impedance.

In the third channel (CH3), in the case where none of the switches $20_1$, $20_2$, $20_3$, and $20_4$ is operated, the power source voltage supplied to the third connector $15_3$ does not attenuate. Consequently, the power source voltage (+5V) supplied to the third connector $11_3$ in the switch input processing module 1 is supplied as it is to the third input port ADC3 in the MCU 8. The MCU 8 detects a state in which no analog signal is supplied to the third input port ADC3. Since the input terminal of the serial signal transmission line 9 has a high impedance, the power source voltage supplied to the third input port ADC3 does not flow to the serial signal transmission line 9 side.

In the first channel (CH1) in the analog multiplex 2, when any of the switches $14_1$, $14_2$, $14_3$, and $14_4$, for example, the switch $14_2$ is operated and the contact point is closed, the power source voltage (+5V) supplied to the first connector $15_1$ is divided by the resistors $12_1$ and $13_1$, and the divided voltage is applied to the first connector $15_1$. At this time, the divided voltage is applied also to the first connector $11_1$ in the switch input processing module 1 and, simultaneously, the divided voltage is supplied to the first input port ADC1 in the MCU 8. The MCU 8 analog-to-digital converts the divided voltage supplied to the first input port ADC1 to a digital signal and performs adjustment of a vehicle-mounted device corresponding to the obtained digital signal.

In the second channel (CH2), when any of the switches $18_1$, $18_2$, $18_3$, and $18_4$, for example, the switch $18_2$ is operated and its connection point is closed, the resistor $16_1$ is connected to the resistor 17 in parallel. At this time, the divided voltage obtained at the second connector $15_2$ becomes a divided voltage (for example, 2.0V) lower than the divided voltage of 2.5V only by an amount corresponding to the connection of the resistor $16_1$. The same low divided voltage is applied as an analog signal to the second connector $11_2$ in the switch input processing module 1, aid is supplied to the second input port ADC2 in the MCU 8. When the low divided voltage is supplied to the second input port ADC2, the MCU 8 analog-to-digital converts the low divided voltage to a digital signal and performs adjustment of a vehicle-mount device corresponding to the obtained digital signal.

Further, in the third channel (CH3), when any of the switches $20_1$, $20_2$, $20_3$, and $20_4$, for example, the switch $20_2$ is operated and its contact is closed, the power source voltage (+5V) supplied to the third connector $15_3$ is divided by the resistors $12_3$ and $19_1$, and the divided voltage is applied to the third connector $15_3$. At this time, the divided voltage is also applied to the third connector $11_3$ in the switch input processing module 1 and, simultaneously, to the third input port ADC3 in the MCU 8. The MCU 8 analog-to-digital converts the divided voltage supplied to the third input port ADC3 to a digital signal, and performs adjustment of a vehicle-mounted device corresponding to the obtained digital signal.

In the case any of the switches $14_1$, $14_3$, and $14_4$ other than the switch $14_2$ is Operated in the first channel (CH1), in the case any of the switches $18_1$, $18_3$, and $18_4$ other than the switch $18_2$ is operated in the second channel (CH2), or in the case any of the switches $20_1$, $20_3$, and $20_4$ other than the switch $20_2$ is operated in the third channel (CH3), although the voltage value obtained at the first connector $15_1$, the voltage value obtained at the second connector $15_2$, or the voltage value obtained at the third connector $15_3$ is different from the above voltage value, operations similar to the above-described ones are performed.

The operation in the case where the serial multiplex 3 is selectively connected to the switch input processing module 1 will now be described.

When the serial multiplex 3 is connected to the switch input processing module 1, a switching-on signal is supplied from the first switch port SW1 to the switch terminal of the power circuit 10 to switch the power circuit 10 on. The power source voltage at the power source terminal +5V is supplied to the first connector $11_1$ via the power circuit 10. The power source voltage at the power source terminal +5V is supplied to the first, second, and third connectors $11_1$, $11_2$, and $11_3$ via the power circuit 10 and the resistors $12_2$ and $12_3$, respectively, and then supplied to the first, second, and third connectors $25_1$, $25_2$, and $25_3$, respectively, in the serial multiplex 3 via the cable reel 4 shown in FIG. 1.

In the serial multiplex 3, the power supply voltage supplied to the first connector $25_1$ is adjusted via the power circuit 23 and supplied to the power source port PW of the MCU 21, so that the MCU 21 becomes operative. Since the second connector $25_2$ is open, the same power supply voltage as that supplied to the second connector $25_2$ is applied to the second connector $11_2$. The power supply voltage is supplied as a determination signal to the second input port ADC2 in the MCU 8. When the determination signal is supplied to the second input port ADC2, the MCU 8 analog-to-digital converts the determination signal to a digital determination signal, and compares the obtained digital determination signal with the digital reference voltage value. The MCU 8 determines that the voltage value of the digital determination signal exceeds the digital reference voltage value by the comparison, supplies a switching-on signal from the second switch port SW2 to the switch terminal of the serial signal transmission line 9 to make the serial signal transmission line 9 conductive. The power supply voltage supplied to the third connector $25_3$ is supplied to the output terminal of the serial signal interface 22 to set the reference level of the serial signal outputted from the serial signal interface 22.

When any of the plurality of switches $24_1$ to $24_{17}$ is operated in such a state, the contact of the operated switch is closed, so that the switch port SW in the MCU 21 to which the operated switch is connected comes to have the earth level. In response to the change of the switch port SW to the earth level, the MCU 21 generates a serial signal corresponding to the switch port SW and supplies the serial signal from the serial signal output port SO to the third connector $25_3$ via the serial signal interface 22. The serial signal is then transferred from the third connector $25_3$ the third connector $11_3$ in the switch input processing module 1 and is supplied from the third connector $11_3$ via the serial signal transmission line 9 in a conductive state to the serial signal input port SI in the MCU 8. When the serial sign,al is supplied, the MCU 8 performs adjustment of a vehicle-mounted device corresponding to the serial signal.

Figure 5:
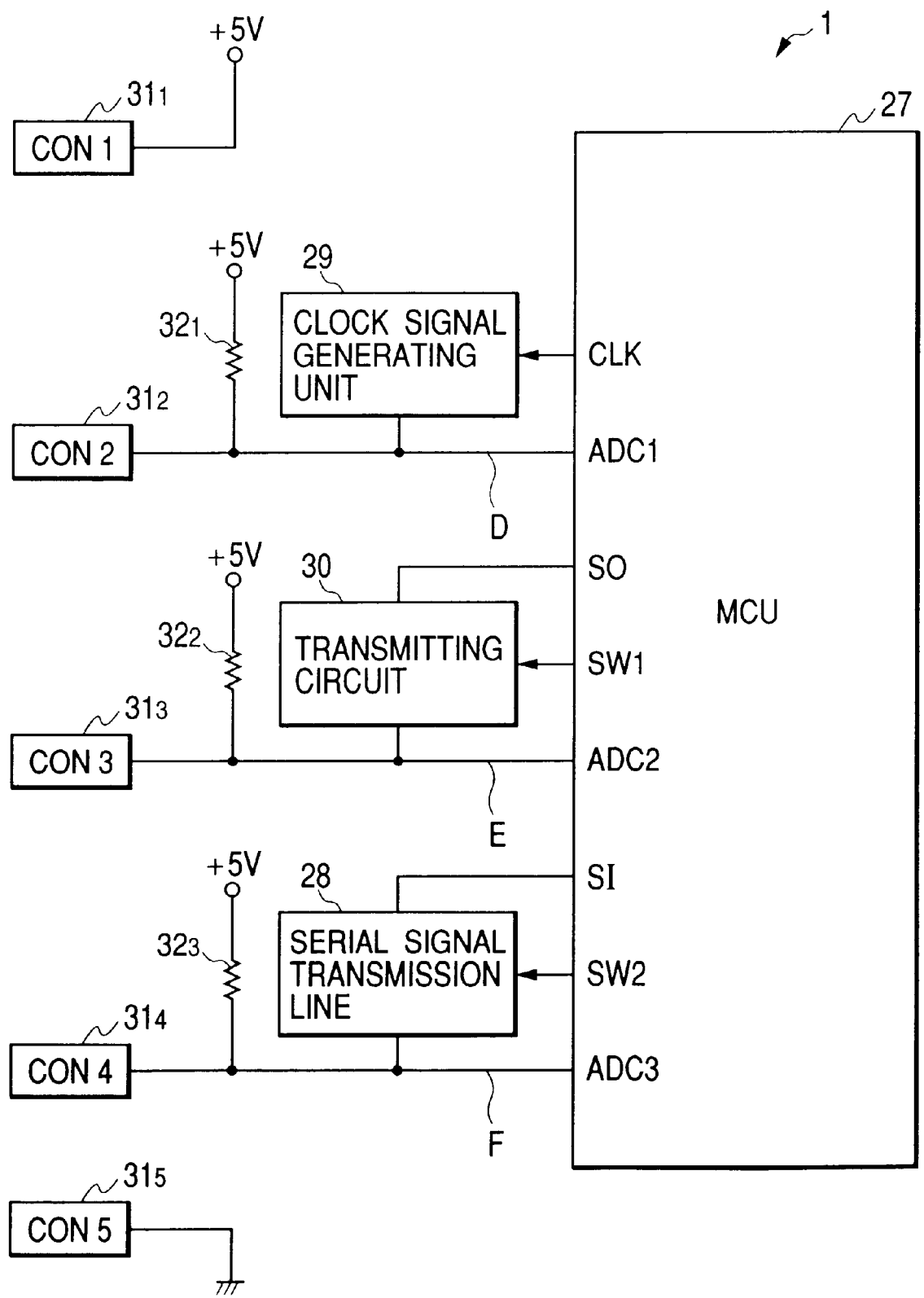
FIG. 5 is a circuit diagram showing another embodiment of the configuration of the switch input processing module for use in the signal transmitting device related to steering illustrated in FIG. 1.
Figure 6:
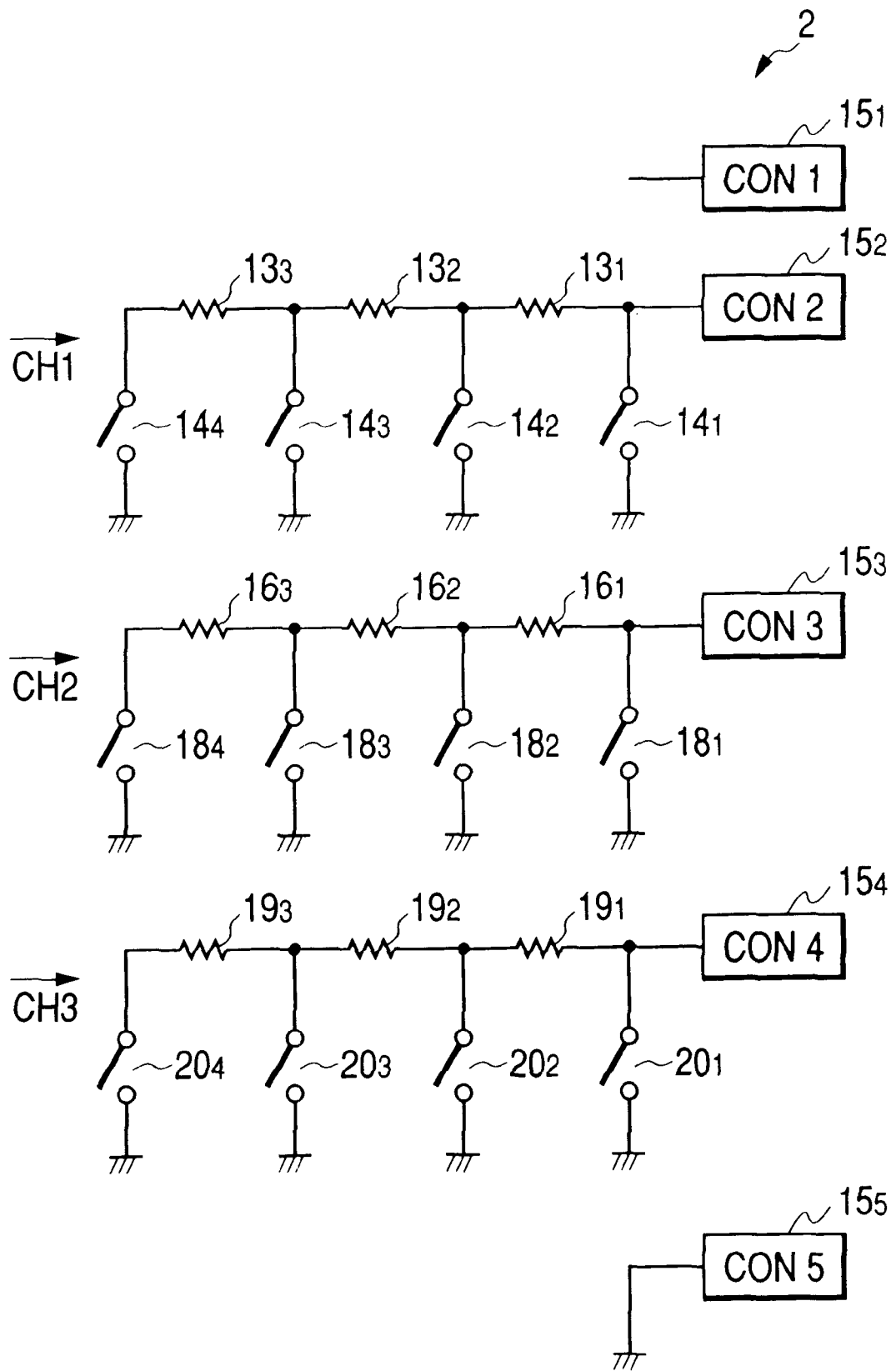
FIG. 6 is a circuit diagram showing another embodiment of the configuration of the analog multiplex for use in the signal transmitting device related to steering illustrated in FIG. 1.

FIG. 5 is a circuit diagram showing another embodiment of the configuration of the switch input processing module 1 for use in the signal transmitting device related to steering shown in FIG. 1. FIG. 6 is another circuit diagram showing the configuration of the analog multiplex 2 for use in the signal transmitting device related to steering shown in FIG. 1. FIG. 4 is another circuit diagram showing the configuration of the serial multiplex 3 for use in the signal transmitting device related to steering shown in FIG. 1.

As shown in FIG. 5, the switch input processing module 1 according to the embodiment has a micro computer unit (MCU) 27, a serial signal transmission line 28, a clock signal generating unit 29, a transmitting circuit 30, a first connector (CON1) $31_1$, a second connector (CON2) $31_2$, a third connector (CON3) $31_3$, a fourth connector (CON4) $31_4$, a fifth connector (CON5) $31_5$, and resistors $32_1$, $32_2$, and $32_3$.

The MCU 27 has a first input port ADC1 connected via an analog signal transmission line D to both the second connector $31_2$ and the output terminal of the clock signal generating unit 29; a clock port CLK connected to the control terminal of the clock signal generating unit 29; a second input port ADC2 connected via an analog signal transmission line E to both the third connector $31_3$ and the output terminal of the transmitting circuit 30; a first switch port SW1 connected to the control terminal of the transmitting circuit 30; a serial signal output port SO connected to the input terminal of the transmitting circuit 30; a serial signal input port SI connected to the output terminal of the serial signal transmission line 28; a second switch port SW2 connected to the control terminal of the serial signal transmission line 28; and a third input port ADC3 connected via an analog signal transmission line F to both the fourth connector $31_4$ and the input terminal of the serial signal transmission line 28. The first connector $31_1$ is connected to the power source terminal +5V, and the fifth connector $31_5$ is connected to the earth point. Further, one end of the resistor $32_1$ is connected to the power source terminal +5V and the other end is connected to the second connector $31_2$. One end of the resistor $32_2$ is connected to the power source terminal +5V and the other end is connected to the third connector $31_3$. One end of the resistor $32_3$ is connected to the power source terminal +5V and the other end is connected to the fourth connector $31_4$. The serial signal transmission line 28 has the same configuration as that of the serial signal transmission line 9 shown in FIG. 2.

As illustrated in FIG. 6, the analog multiplex 2 which is used together with the switch input processing module 1 shown in FIG. 5 has the three channels of the first, second, and third channels (1CH, 2CH, and 3CH) like the analog multiplex 2 shown in FIG. 3 and has the configuration similar to that of the analog multiplex 2 shown in FIG. 3 except for the following. The resistor 17 is not connected in the second channel (2CH), the second connector (CON2) $15_2$ is connected in the first channel (1CH) the third connector (CON3) $15_3$ is connected in the second channel (2CH), the fourth connector (CON4) $15_4$ is connected in the third channel (3CH), and the fifth connector (CON5) $15_5$ connected to the earth point is separately provided. Consequently, the same reference numerals are designated to the same components in the analog multiplex 2 in FIG. 6 as those in the analog multiplex 2 shown in FIG. 3, and their description is omitted here.

Figure 7:
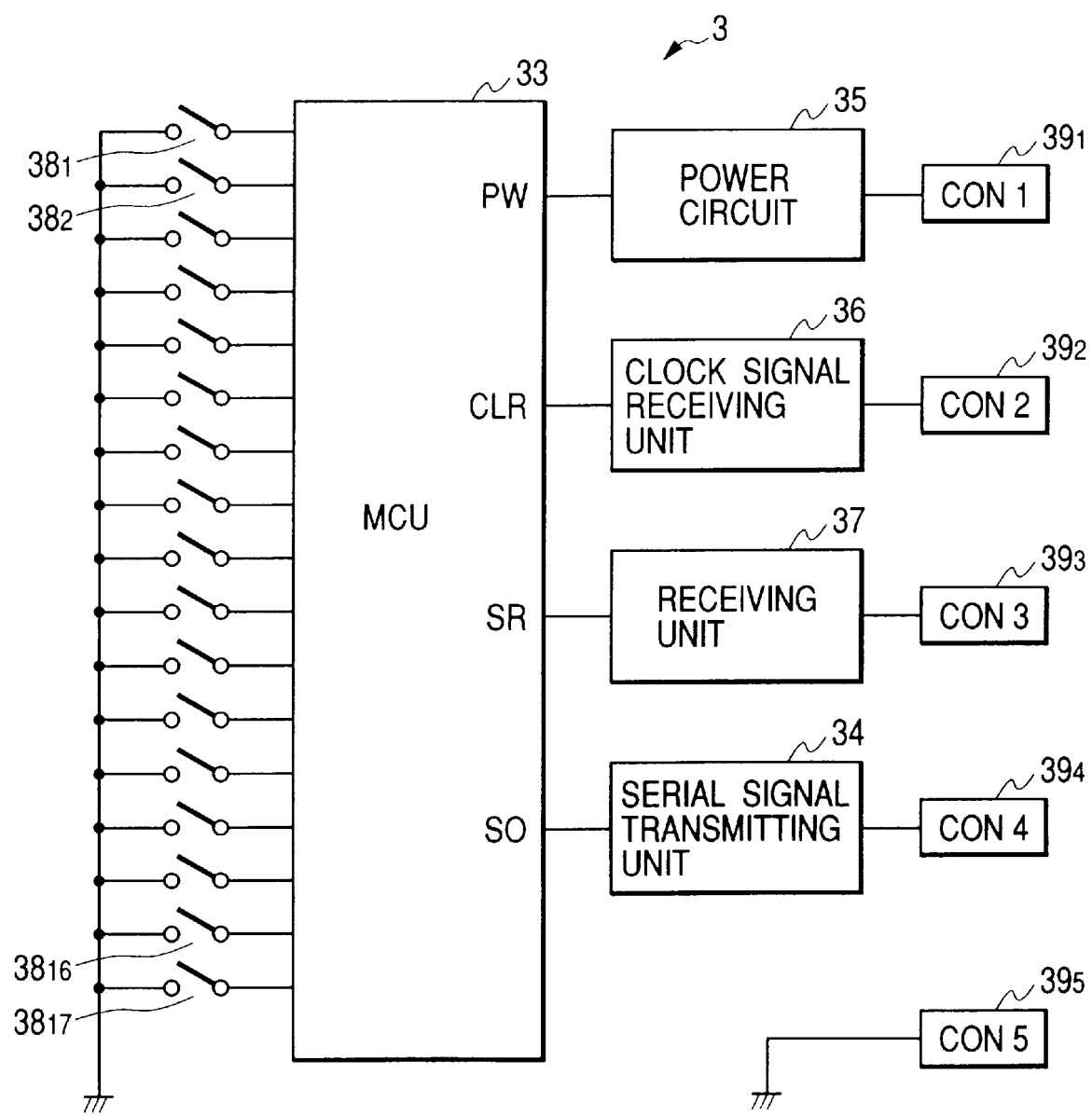
FIG. 7 is a circuit diagram showing another embodiment of the configuration Off the serial multiplex for use in the signal transmitting device related to steering illustrated in FIG. 1.

As shown in FIG. 7, the serial multiplex 3 which is used together with the switch input processing module 1 illustrated in FIG. 5 has a micro computer unit (MCU) 33, a serial signal interface (I/F) 34, a power circuit 35, a clock signal receiving unit 36, a receiving circuit 37, a plurality of switches $38_1$ to $38_{17}$, a first connector (CON1) $39_1$, a second connector (CON2) $39_2$, a third connector (CON3) $39_3$, a fourth connector (CON4) $39_4$, and a fifth connector (CON5) $39_5$.

In the MCU 33, a plurality of switch, ports SW are connected to the earth point via the switches $38_1$ to $38_{17}$, respectively. A serial signal output port SO is connected to the input terminal of the serial signal interface (I/F) 34. A power source port PW is connected to the output terminal of the power circuit 35. A clock input port CLR is connected to the output terminal of the clock signal receiving unit 36. A signal input port SR is connected to the output terminal of the receiving circuit 37. The output terminal of the serial signal interface 34 is connected to the fourth connector $39_4$, and the input terminal of the power circuit 35 is connected to the first connector $39_1$. The input terminal of the clock signal receiving unit 36 is connected to the second connector $39_2$, and the input terminal of the receiving circuit 37 is connected to the third connector $39_3$. The fifth connector $39_5$ is connected to the earth point. In this case, the serial signal interface 34 has the same configuration as that of the serial signal interface 22 shown in FIG. 4. The power circuit 35 has the same configuration as that of the power circuit 23 shown in FIG. 4.

The operation in the case where the analog multiplex 2 is selectively connected to the switch input processing module 1 will be described In the switch input processing module 1, the power source voltage at the power source terminal +5V is directly supplied to the first connector $31_1$ and is also supplied to the second to fourth connectors $31_2$ to $31_4$ via the resistors $32_1$ to $32_3$, respectively, and then supplied to the first to fourth connectors $39_1$ to $39_4$, respectively, in the analog multiplex 2 via the cable reel 4.

On the other hand, in the analog multiplex 2, when none of the switches $14_1$, $14_2$, $14_3$, and $14_4$ in the first channel (CH1) is operated, the power source voltage (+5V) supplied to the second connector $15_2$ does note attenuate, and the same power source voltage is applied to the second connector $31_2$ in the switch input processing module 1 and is supplied to the first input port ADC1 in the MCU 27. The MCU 27 consequently detects the state where no analog signal is inputted to the first input port ADC1. When the analog multiplex 2 is connected, the MCU 27 supplies a non-driving signal from the clock port CLK to the control terminal of the clock signal generating unit 29 to thereby make the clock signal generating unit 29 nonoperative.

When none of the switches $18_1$ to $18_4$ in the second channel (CH2) is operated, the power source voltage (+5V) supplied to the third connector $15_3$ does not attenuate. The same power source voltage is also applied to the third connector $31_3$ in the switch input processing module 1 and is supplied to the second input port ADC2 in the MCU 27. The MCU 27 consequently detects that no analog signal is supplied to the second input port ADC2. When the analog multiplex 2 is connected to the switch input processing module 1, the MCU 27 supplies a non-driving signal from the first switch port SW1 to the control terminal of the transmitting circuit 30 to thereby make the transmitting circuit 30 nonoperative.

Further, when none of the switches $20_1$, $20_2$, $20_3$, and $20_4$ in the third channel (CH3) is operated, the power source voltage supplied to the fourth connector $15_4$ does not attenuate in a manner similar to the above. The power source voltage (+5V) supplied to the fourth connector $31_4$ in the switch input processing module 1 is supplied as a determination signal to the third input port ADC3 in the MCU 27. The MCU 27 analog-to-digital converts the determination signal supplied to the third input port ADC3 to a digital determination signal and compares the derived digital determination signal with a digital reference voltage value pre-stored in an internal memory. By the comparison, the MCU 27 determines whether or not the voltage value of the digital determination signal exceeds the digital reference voltage value, supplies a switching-off signal from the second switch port SW2 to the control terminal of the serial signal transmission line 28 to make the serial signal transmission line 28 nonconductive, and detects that no analog signal is supplied to the third input port ADC3.

Subsequently, when any of the switches $14_1$, $14_2$, $14_3$ and $14_4$, for example, the switch $14_2$ in the first channel (CH1) in the analog multiplex 2 is operated and the contact point of the switch $14_2$ is closed, the power source voltage (+5V) is divided by the resistors $32_1$ and $13_1$. The divided voltage is applied to the second connectors $15_2$ and $31_2$. When the divided voltage is supplied to the first input port ADC1 in the MCU 27, the MCU 27 analog-to-digital converts the supplied divided voltage to a digital signal, and performs adjustment of a vehicle-mounted device corresponding to the obtained digital signal.

When any of the switches $18_1$, $18_2$, $18_3$, and $18_4$, for example, the switch $18_2$ in the second channel (CH2) is operated and the contact point of the switch $18_2$ is closed, the power source voltage (+5V) is divided by the resistors $32_2$ and $16_1$, and the divided voltage is applied to the third connectors $15_3$ and $31_3$. When the divided voltage is supplied to the second input port ADC2 of the MCU 27, the MCU 27 analog-to-digital converts the supplied divided voltage to a digital signal and performs adjustment of a vehicle-mounted device corresponding to the derived digital signal 1.

When any of the switches $20_1$, $20_2$, $20_3$, and $20_4$ in the third channel (CH3), for example, the switch $20_2$ is operated and the contact of the switch $20_2$ is closed, the power source voltage (+5V) is divided by the resistors $32_3$ and $19_1$, and the divided voltage is applied ten the fourth connectors $15_4$ and $31_4$. When the divided voltage is supplied to the third input port ADC3 of the MCU 27, the MCU 27 analog-to-digital converts the supplied divided voltage to a digital signal and performs adjustment of a vehicle-mounted device corresponding to the derived digital signal In the case where any of the switches $14_1$, $14_3$, and $14_4$ other than the switch $14_2$ is operated in the first channel (CH1), in the case where any of the switches $18_1$, $18_3$, and $18_4$ other than the switch $18_2$ is operated in the second channel (CH2), or in the case where any of the switches $20_1$, $20_3$, $20_4$ other than the switch $20_2$ is operated in the third channel (CH3), although the voltage value obtained at the second connector $15_2$, the voltage value obtained at the third connector $15_3$, and the voltage value obtained at the fourth connector $15_4$ are different from the above voltage values, operations similar to the above-described ones are performed.

Figure 8:
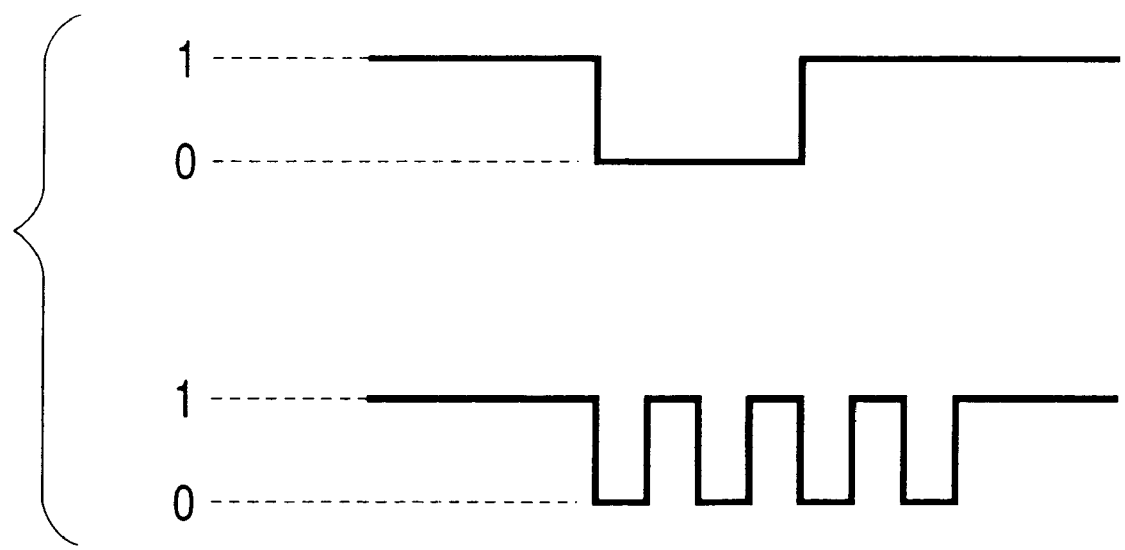
FIG. 8 is a waveform chart showing two examples of determination signals outputted from the serial multiplex.

The operation in the case where the serial multiplex 3 is selectively connected to the switch input processing module 1 will now be described with reference to FIG. 8. FIG. 8 is a waveform chart showing two examples of the determination signal outputted from the serial multiplex 3.

When the serial multiplex 3 is connected to the switch input processing module 1, immediately after the power supply voltage is applied through the switch input processing module 1, the serial multiplex 3 outputs either a pulse determination signal which goes low (level 0) for a predetermined period as shown by the upper waveform in FIG. 8 or a pulse determination signal having a predetermined number of low level parts (level 0) as shown by the lower waveform in FIG. 8 from the serial signal output port SO. After the pulse determination signal passes through the serial signal interface 34 and the fourth connector $39_4$, it is supplied from the fourth connector $31_4$ to the third input port ADC3. At this time, the MCU 27 detects the low level duration of the supplied pulse determination signal or the number of low level portions of the pulse determination signal. When the MCU 27 determines that the detected duration or number is equal to the predetermined duration or number, the MCU 27 supplies a drive signal from the clock port CLK to the control terminal of the clock signal generating unit 29 to thereby make the clock signal generating unit 29 operative, supplies a switching-on signal from the first switch port SW1 to the control terminal of the transmitting circuit 30 to thereby make the transmitting circuit 30 operative, and supplies a switching-on signal from the second switch port SW2 to the control terminal of the serial signal transmission line 28 to thereby make the serial signal transmission line 28 conductive.

When the clock signal generating unit 29 is made operative, it generates a clock signal which is transmitted from the second connector $31_2$ to the second connector $39_2$ in the serial multiplex 3 and is supplied via the clock signal receiving unit 36 to the MCU 33. The MCU 33 generates a serial signal synchronized with the supplied clock signal. When the transmitting circuit 30 is made operative, it transmits, for example, a transmission signal for requiring self diagnosis on the serial multiplex 3 side and a transmission signal to turn on/off a light emitting diode (LED) on the serial multiplex 3 side to the MCU 33 at proper timings. When the serial signal transmission line 28 is made conductive, the serial signal supplied to the fourth connector $31_4$ is transmitted to the MCU 27 via the serial signal transmission line 28.

In the serial multiplex 3, the power source voltage supplied to the first connector $39_1$ is adjusted via the power circuit 35. The adjusted voltage is supplied to the power source port PW of the MCU 33 to thereby make the MCU 33 operative. The power source voltage supplied to the second connector $39_2$ sets the reference level of the clock signal to be supplied to the second connector $39_2$. The power source voltage supplied to the third connector $39_3$ sets the reference level of the transmission signal to be supplied to the third connector $39_3$. Similarly, the power source voltage supplied to the fourth connector $39_4$ sets the reference level of the serial signal. The power source voltage supplied to the second connector $39_2$ sets the reference level of the clock signal to be supplied to the second connector $39_2$. The power source voltage supplied to the third connector $39_3$ sets the reference level of the transmission signal to be supplied to the third connector $39_3$. Similarly, the power source voltage supplied to the fourth connector $39_4$ sets the reference level of the serial signal.

When any of the plurality of switches $38_1$ to $38_{17}$ in the serial multiplex 3 is operated, the contact of the operated switch is closed to set the switch port SW of the MCU 33 to which the operated switch is connected to the earth level. In response to the change to the earth level of the switch port SW, the MCU 33 generates a serial signal corresponding to the switch port SW connected to the ground, and supplies the serial signal from the serial signal output port SO to the fourth connector $39_4$ via the serial signal interface 34. The serial signal is then transmitted from the fourth connector $39_4$ to the fourth connector $31_4$ in the switch input processing module 1, and is supplied from the fourth connector $31_4$ to the serial signal input port SI of the MCU 27 via the serial signal transmission line 28 which is in a conductive state. When the serial signal is supplied, the MCU 27 performs adjustment of a vehicle-mounted device corresponding to the serial signal.

The configurations of the switch input processing module 1, the analog multiple 2, and the serial multiplex 3 used for the signal transmitting device related to steering are not limited to those in the foregoing embodiments. Other configurations may be adopted as long as the basic operating modes are unchanged.

The format of the determination signal is not also limited to each of those in the foregoing embodiments. Determination signals of other formats may be also used as long as the MCUs 8 and 27 on the switch input processing module 1 side can relatively easily determination by using the determination signals.

As described above, according to the invention, the determination signal indicating that the signal to be supplied is either an analog signal or a serial signal is supplied to the MCU prior to the supply of the analog signal or the serial signal. When the determination signal supplied indicates an analog signal, the MCU sets the serial signal transmission line to be nonconductive and supplies the analog signal only to the analog signal supply port. When the determination signal supplied indicates a serial signal, the MCU sets the serial transmission line to be conductive and the serial signal is supplied only the serial signal supply port via the serial signal transmission line. By making a simple configuration change, the switch input processing module can be used for both the analog and serial signals. As a result, an effect such that the switch input processing module with a simple configuration can be obtained at a low manufacturing cost is produced.

What is claimed is:

1. A switch input processing module comprising:
    a control unit;
    an external connection terminal containing a first external connection terminal and a second external connection terminal;
    an analog signal transmission line and a serial signal transmission line each of which is disposed between the first external connection terminal and the control unit;
    a determination signal applied to the second external connection terminal indicating that either an analog multiplex or a serial multiplex is connected to the first external connection terminal, said analog multiplex and said serial multiplex each containing a plurality of switches; and,
    wherein when the control unit determines that the determination signal indicates connection of the serial multiplex, the control unit makes the serial signal transmission line conductive, and when the control unit determines that the determination signal indicates connection of the analog multiplex, the control unit makes the serial signal transmission line nonconductive.

2. The switch input processing module according to claim 1, wherein the first external connection terminal and the second external connection terminals are separate external connection terminals.

3. The switch input processing module according to claim 1, wherein the first external connection terminal and the second external connection terminals are the same external connection terminal.

4. The switch input processing module according to claim 1, wherein the determination signal indicative of connection of the analog multiplex has voltage value equal to or lower than a reference voltage value.

5. A switch input processing module comprising:
    a control unit;
    an analog multiplex having a plurality of manually-operated switches;
    a serial multiplex having a plurality of manually-operated switches;
    a first external connection terminal;
    a second external connection terminal;
    an analog signal transmission line which is disposed between the first external connection terminal and the control unit; and
    a serial signal transmission line which is branched from the analog signal transmission line, the serial signal transmission line being made conductive or nonconductive under the control of the control unit;
    wherein the control unit receives via the second external connection terminal a determination signal indicating that the serial multiplex is connected to the first external connection terminal, and
    when the control unit determines that the determination signal indicates connection of the serial multiplex to the first external connection terminal, the control unit makes the serial signal transmission line conductive and receives a serial signal indicating operating state of the plurality of manually-operated switches of the serial multiplex via the serial signal transmission line.

6. The switch input processing module according to claim 5, wherein the first external connection terminal and the second external connection terminal are separate connection terminals.

7. The switch input processing module according to claim 5, wherein the first external connection terminal and the second external connection terminal are the same external connection.

8. The switch input processing module according to claim 5, wherein the determination signal indicative of connection of the serial multiplex is a pulse signal having at least one of a predetermined pulse width and a predetermined number of pulses.

* * * * *

UNITED STATES PATENT AND TRADEMARK OFFICE
CERTIFICATE OF CORRECTION

PATENT NO. : 6,704,829 B1
DATED : March 9, 2004
INVENTOR(S) : Toshiyuki Hoshi et al.

Page 1 of 1

It is certified that error appears in the above-identified patent and that said Letters Patent is hereby corrected as shown below:

Column 14,
Line 3, after "analog multiplex has" insert -- a --.

Signed and Sealed this

Eleventh Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,704,829 B1
APPLICATION NO. : 09/712384
DATED : March 9, 2004
INVENTOR(S) : Toshiyuki Hoshi et al.

It is certified that error appears in the above-identified patent and that said Letters Patent is hereby corrected as shown below:

On the Title Page

Item (73) DELETE "Sony Corporation, Tokyo (JP)"

Signed and Sealed this
Twenty-second Day of May, 2012

David J. Kappos
*Director of the United States Patent and Trademark Office*